(12) United States Patent
Wittenberg et al.

(10) Patent No.: US 7,006,274 B1
(45) Date of Patent: Feb. 28, 2006

(54) COMPACT ACOUSTO-OPTICAL MODULATOR

(75) Inventors: Carl Wittenberg, Water Mill, NY (US); Chinh Tan, Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/091,683

(22) Filed: Mar. 28, 2005

Related U.S. Application Data

(63) Continuation-in-part of application No. 11/043,458, filed on Jan. 26, 2005.

(60) Provisional application No. 60/633,951, filed on Dec. 7, 2004.

(51) Int. Cl.
*G02F 1/11* (2006.01)
*G02B 26/00* (2006.01)

(52) U.S. Cl. .................................... 359/285; 359/238
(58) Field of Classification Search ................ 359/285, 359/238, 239, 240, 286, 287
See application file for complete search history.

(56) References Cited

U.S. PATENT DOCUMENTS 4,991,923 A * 2/1991 Kino et al. .................... 385/1

* cited by examiner

*Primary Examiner*—Timothy Thompson
(74) *Attorney, Agent, or Firm*—Kirschstein, et al.

(57) ABSTRACT

A lightweight, compact image projection module, especially for mounting in a housing having a light-transmissive window, is operative for causing selected pixels in a raster pattern to be illuminated to produce an image of high resolution of VGA quality in color. A compact acousto-optical modulator is used to modulate a green laser beam used to produce the image.

20 Claims, 8 Drawing Sheets

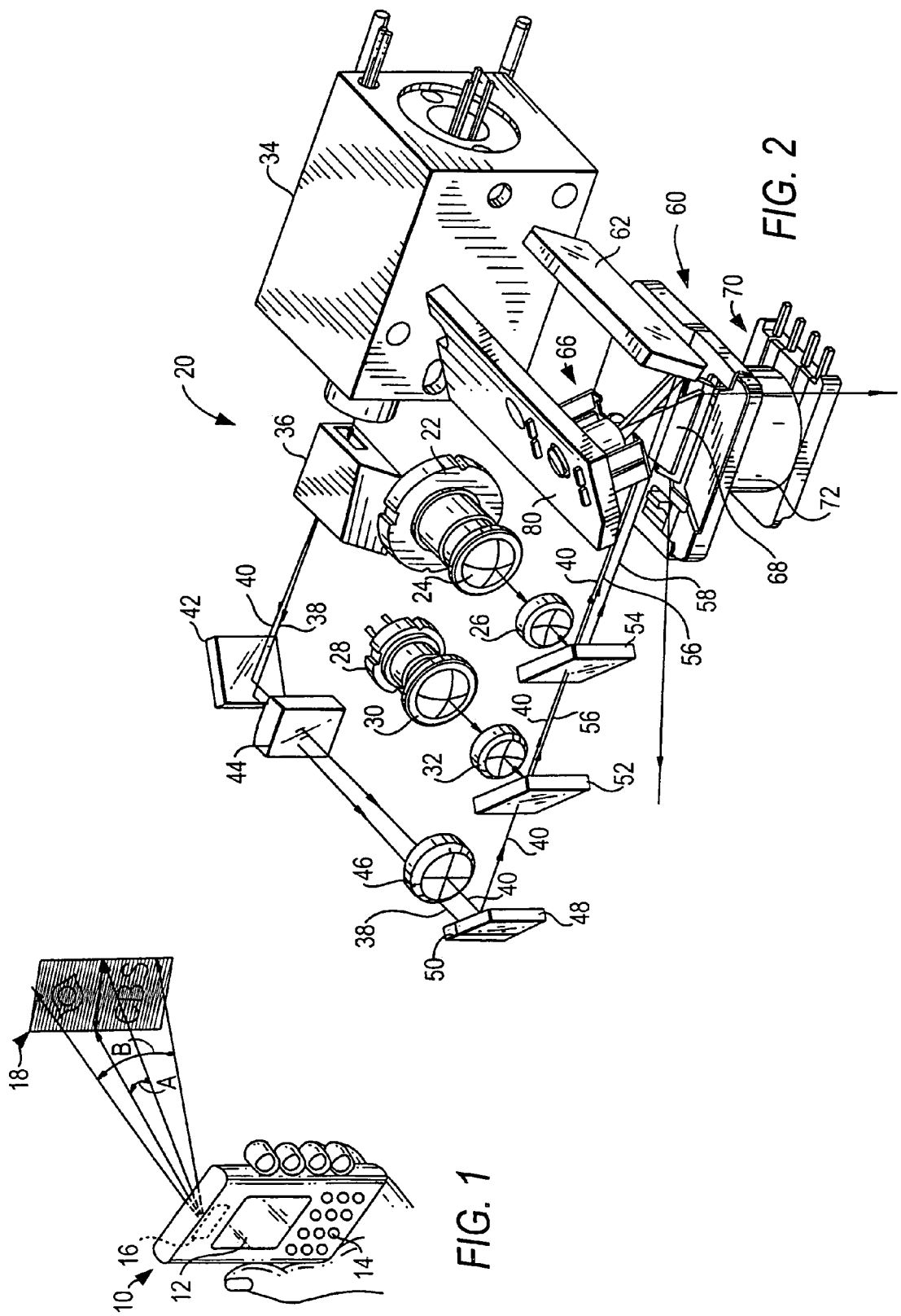

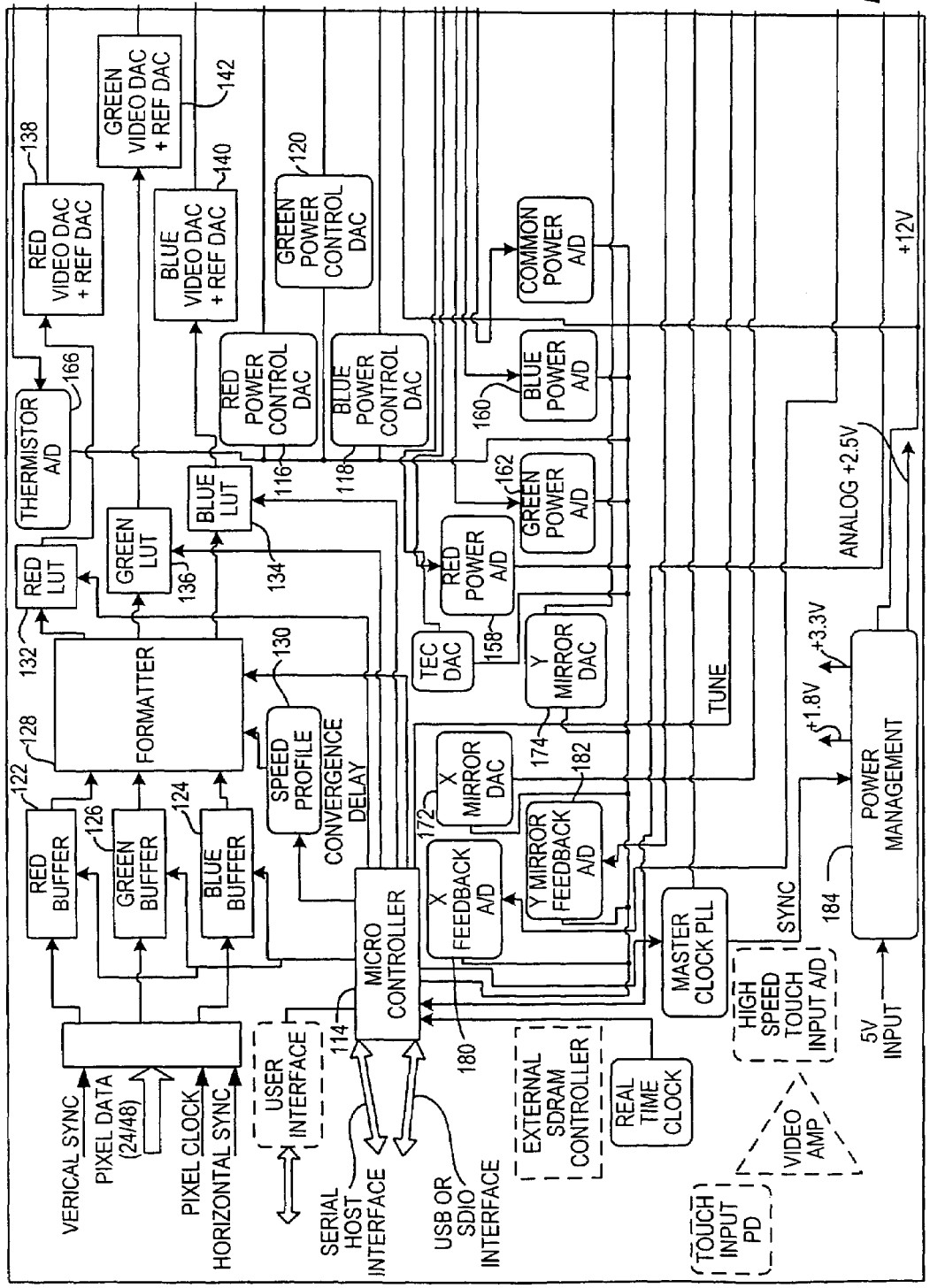

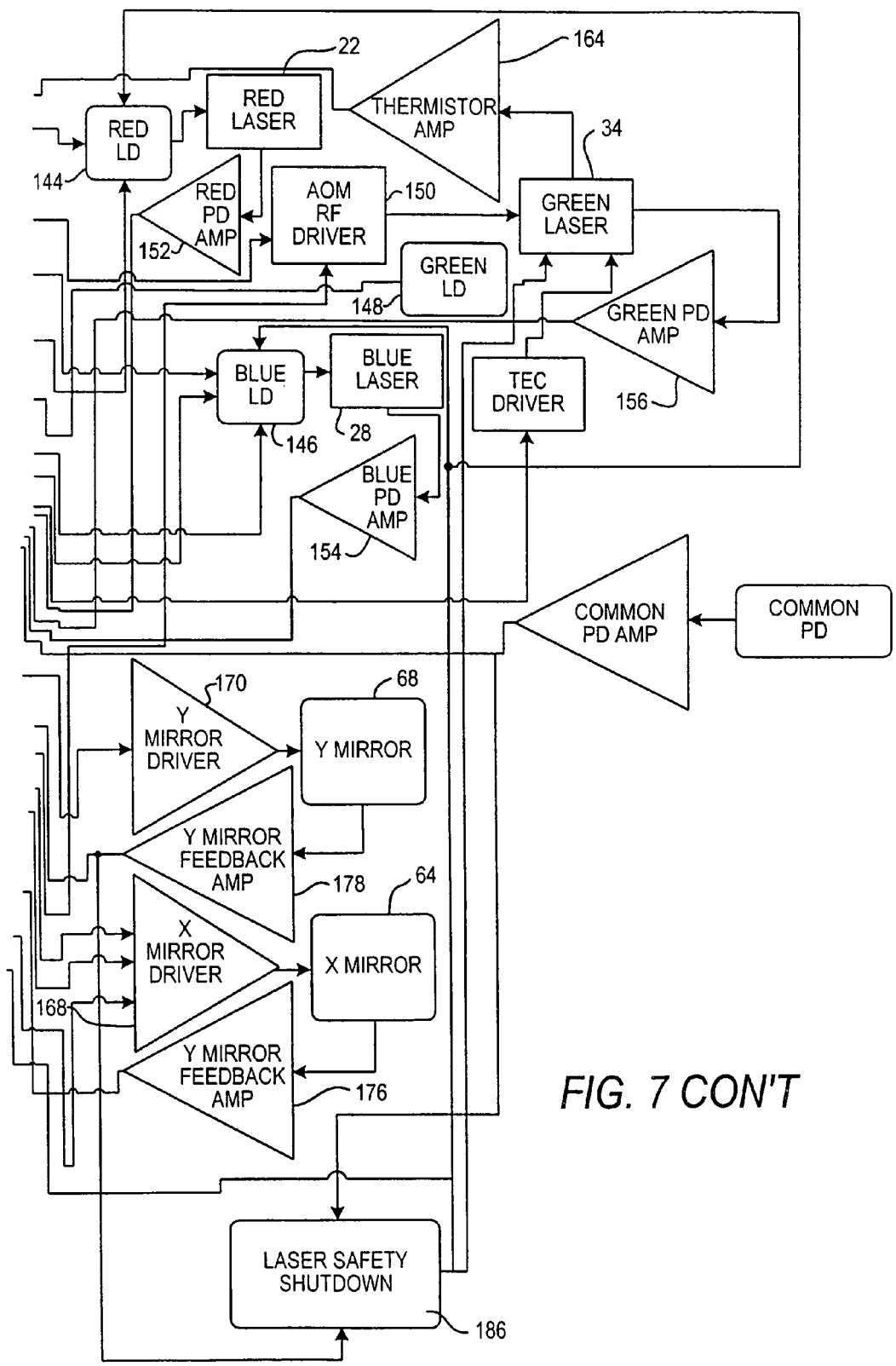
FIG. 7 CON'T

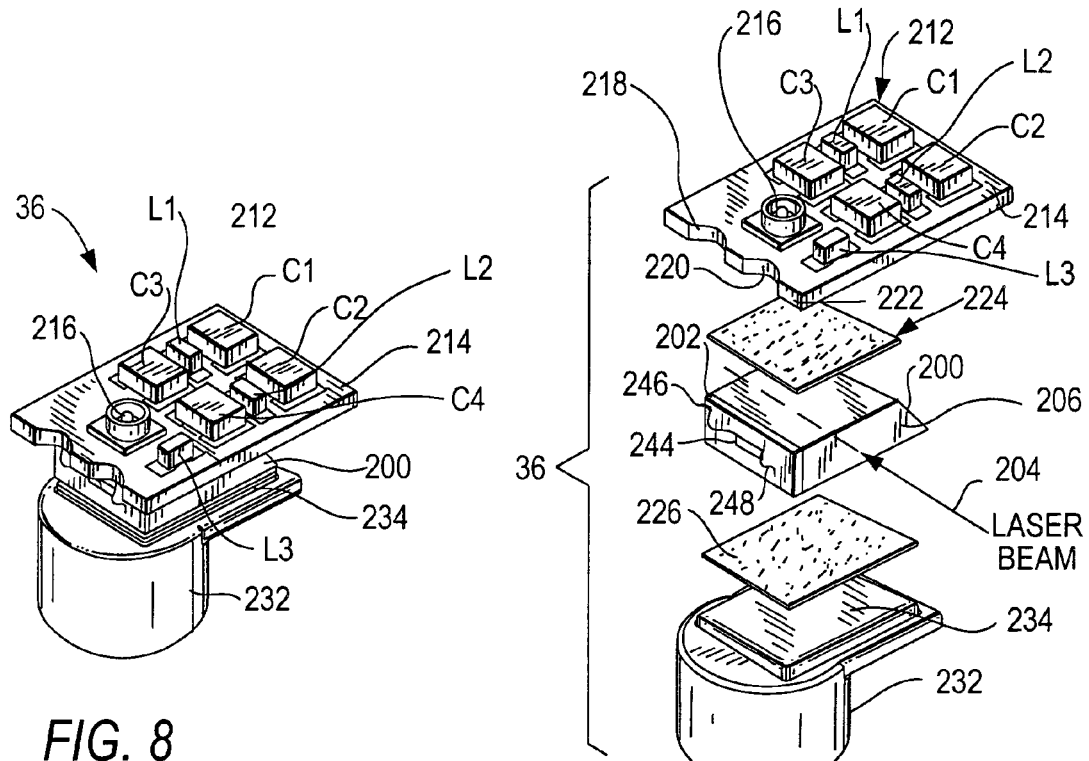
FIG. 8
FIG. 9
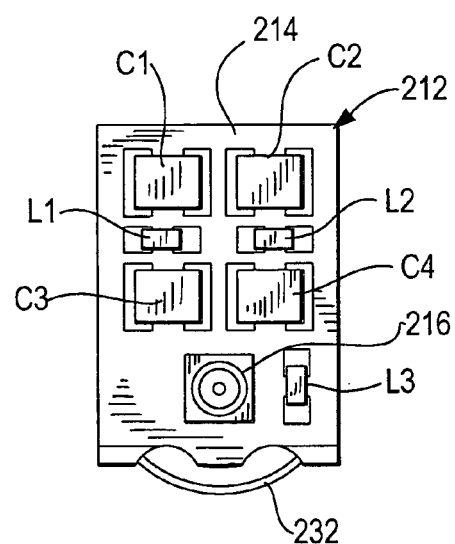
FIG. 10

COMPACT ACOUSTO-OPTICAL MODULATOR

CROSS REFERENCE TO RELATED APPLICATION

This application is a continuation-in-part of U.S. patent application Ser. No. 11/043,458, filed Jan. 26, 2005, which, in turn, claims priority to U.S. Provisional Patent Application Ser. No. 60/633,951, filed Dec. 7, 2004.

BACKGROUND OF THE INVENTION

1. Field of the Invention

The present invention generally relates to an acousto-optical modulator (AOM), a method of making the AOM, and an arrangement for and a method of adjusting laser beam power using the AOM, especially for use in a color image projection system operative for projecting a two-dimensional image in color while maintaining low power consumption, high resolution, miniature compact size, quiet operation and minimal vibration.

2. Description of the Related Art

It is generally known to project a two-dimensional image on a screen based on a pair of scan mirrors which oscillate in mutually orthogonal directions to scan a laser beam over a raster pattern. However, the known image projection systems project the image with limited resolution, typically less than a fourth of video-graphics-array (VGA) quality of 640×480 pixels, and not in true color.

To obtain a true color image, red, blue and green lasers are required to be pulsed at frequencies on the order of 100 MHz. Currently available red and blue lasers can be pulsed at such high frequencies, but the currently available green lasers cannot. As a result, an acousto-optical modulator (AOM) is used to high frequency modulate the intensity of the green laser beam emitted by the green laser. Typically, the AOM includes a crystal through which the green beam passes, an acoustic transducer for producing acoustic waves in the crystal to produce a modulated output beam, and a matching network for impedance matching an acoustic drive signal to the transducer.

However, the physical size of the known AOMs is relatively large, thereby rendering them impractical for use in miniature, hand-held, battery-operated applications. For example, the matching network and the crystal are typically mounted in spaced apart relation to each other on a common heat sink. Also, it is cumbersome to adjust the position of the known AOMs relative to the laser beam, because an optical bench of substantial size and having multiple freedoms of movement is required. The known matching networks also use manually tunable components, which contribute to a high assembly cost.

SUMMARY OF THE INVENTION

Objects of the Invention

Accordingly, it is a general object of this invention to provide a compact acousto-optical modulator (AOM), especially for use in an image projection arrangement that projects a sharp and clear, two-dimensional color image over an extended range of distances away from the arrangement.

Another object of this invention is to minimize the physical size of such AOMs.

Still another object of this invention is to simplify the adjustment of laser beam output power produced by such AOMs.

Yet another object of this invention is to eliminate tuning of the matching networks used in such AOMs.

An additional object is to provide a miniature, compact, lightweight, and portable color image projection arrangement useful in many instruments of different form factors.

Features of the Invention

In keeping with these objects and others which will become apparent hereinafter, one feature of this invention resides, briefly stated, in a compact, acousto-optical modulator (AOM) and method of making the same, which comprise an assembly including a crystal, preferably an acousto-optical crystal, and an acoustic transducer, preferably a piezo-electric transducer, for modulating the intensity of a laser beam incident on the crystal with an acoustic wave generated by the transducer to produce a modulated output beam. The AOM also comprises a matching network supported by the assembly, for impedance matching of an acoustic drive signal, preferably a radio frequency signal, to the transducer, as well as a mount having an axis, and operative for supporting the assembly and the matching network for joint movement along, and in a circumferential direction about, the axis.

Thus, in accordance with one feature of this invention, the matching network is not mounted in spaced-apart relation away from the assembly, but instead is mounted on the assembly for joint movement therewith not only axially for a height adjustment, but also circumferentially for an angular adjustment. Moreover, a heat-conductive adhesive is used between the matching network and the assembly, as well as between the assembly and the mount, to conduct waste heat to the mount, rather than employing a separate heat sink.

Still another feature of this invention resides in enabling direct point-to-point wirebonding between the matching network and the assembly without changing the orientation of any of the components of the AOM. Thus, the matching network includes a printed circuit board having a conductively plated edge lying in a plane generally parallel to the axis. The assembly has an electrode which is also situated in a plane lying generally parallel to the axis. Since the electrode and the plated edge face in the same direction, a direct point-to-point wirebonding is performed. By contrast, the prior art requires wires to be bonded at points facing in different directions between the assembly and the matching network, thereby requiring the components to be repositioned during wirebonding.

A connector, preferably a co-axial radio frequency (RF) connector, is mounted on the board in alignment with the axis. Thus, in accordance with yet another feature of this invention, a spring-loaded RF probe is axially connected to the RF connector to apply the acoustic drive signal to the transducer while a laser beam is incident on the crystal. The position of the AOM is thereupon adjusted while the laser beam is incident on the crystal and while the acoustic drive signal is applied to the transducer. By changing the height and/or angular position of the AOM relative to the laser beam, the power of the output beam is adjusted, preferably to a maximum value. During this adjustment of the AOM, the RF probe does not interfere with either the height or angular adjustment, because the RF probe extends along the axis.

Yet another feature is embodied in making all the impedances on the matching network non-adjustable. In the prior art, manual tuning of inductance coils is used to compensate for tolerance ranges. However, by using fixed impedances, such tuning is avoided.

Use and adjustment of the AOL are particularly beneficial in an image projection arrangement for projecting a two-dimensional, color image. The arrangement includes a support having a mounting passage; a plurality of red, blue and green lasers for respectively emitting red, blue and green laser beams; an optical assembly for co-linearly arranging the laser beams to form a composite beam; a scanner for sweeping the composite beam as a pattern of scan lines in space at a working distance from the support, each scan line having a number of pixels; and a controller for causing selected pixels to be illuminated, and rendered visible, by the laser beams to produce the color image. The mount of the AOM is mounted in the mounting passage for movement along, and circumferentially about, the axis to achieve the aforementioned power adjustment of the output beam, especially of the green beam.

In the preferred embodiment, the scanner includes a pair of oscillatable scan mirrors for sweeping the composite beam along generally mutually orthogonal directions at different scan rates and at different scan angles. At least one of the scan rates exceeds audible frequencies, for example, over 18 kHz, to reduce noise. At least one of the scan mirrors is driven by an inertial drive to minimize power consumption. The image resolution preferably exceeds one-fourth of VGA quality, but typically equals or exceeds VGA quality. The AOM, support, lasers, scanner, controller and optical assembly preferably occupy a volume of less than thirty cubic centimeters.

The arrangement is interchangeably mountable in housings of different form factors, including, but not limited to, a pen-shaped, gun-shaped or flashlight-shaped instrument, a personal digital assistant, a pendant, a watch, a computer, and, in short, any shape due to its compact and miniature size. The projected image can be used for advertising or signage purposes, or for a television or computer monitor screen, and, in short, for any purpose desiring something to be displayed.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a hand-held instrument projecting an image at a working distance therefrom;

FIG. 2 is an enlarged, overhead, perspective view of an image projection arrangement in accordance with this invention for installation in the instrument of FIG. 1;

FIG. 7 is an electrical schematic block diagram depicting operation of the arrangement of FIG. 2;

FIG. 8 is a perspective view of an acousto-optical modulator (AOM) as used in the arrangement of FIG. 6;

FIG. 9 is an exploded view of the AOM of FIG. 8;

FIG. 10 is a top plan view of the AOM of FIG. 8;

DETAILED DESCRIPTION OF THE PREFERRED EMBODIMENTS

Figure 3:
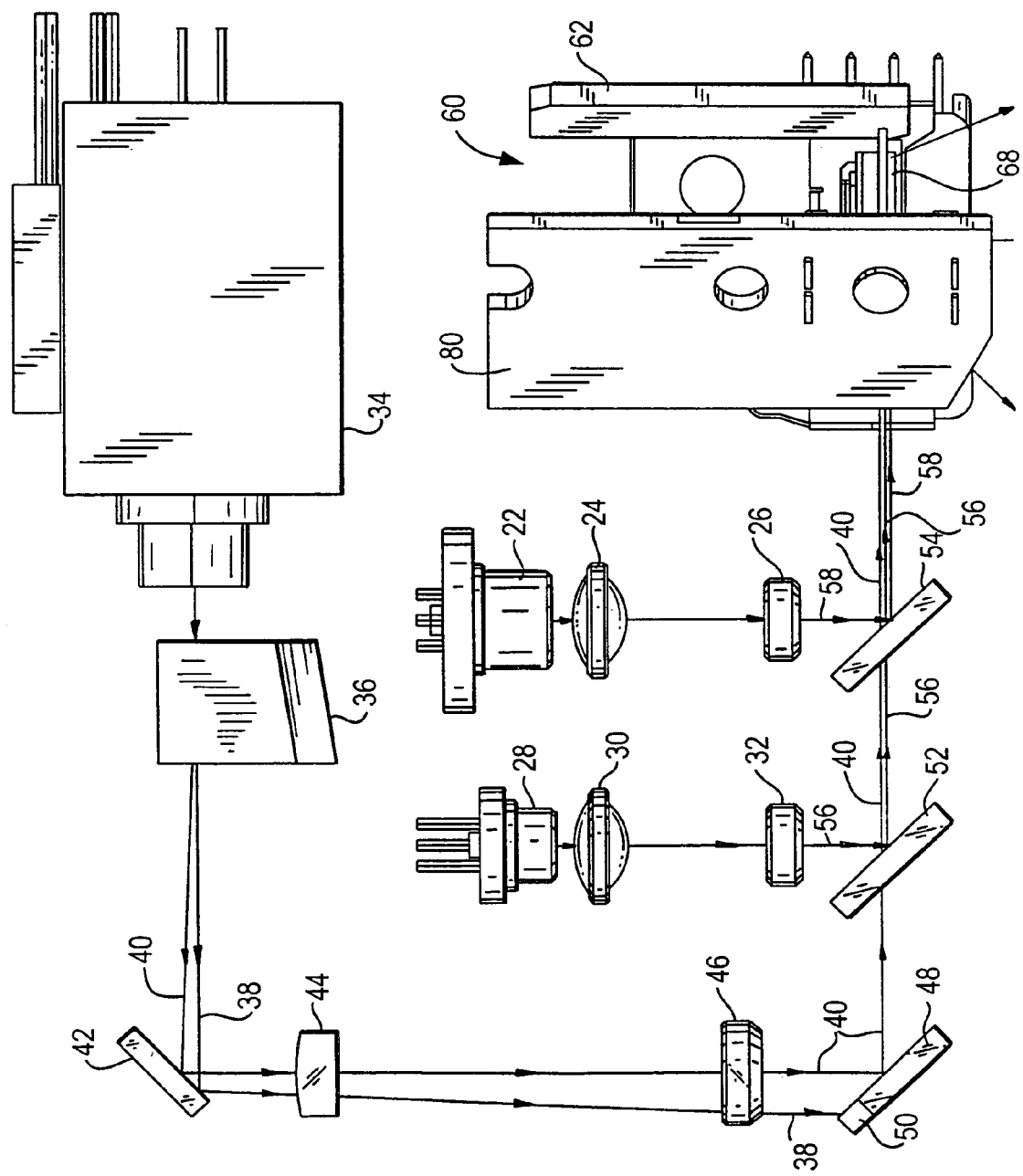
FIG. 3 is a top plan view of the arrangement of FIG. 2.

Reference numeral 10 in FIG. 1 generally identifies a hand-held instrument, for example, a personal digital assistant, in which a lightweight, compact, image projection arrangement 20, as shown in FIG. 2, is mounted and operative for projecting a two-dimensional color image at a variable distance from the instrument. By way of example, an image 18 is situated within a working range of distances relative to the instrument 10.

As shown in FIG. 1, the image 18 extends over an optical horizontal scan angle A extending along the horizontal direction, and over an optical vertical scan angle B extending along the vertical direction, of the image. As described below, the image is comprised of illuminated and non-illuminated pixels on a raster pattern of scan lines swept by a scanner in the arrangement 20.

The parallelepiped shape of the instrument 10 represents just one form factor of a housing in which the arrangement 20 may be implemented. The instrument can be shaped as a pen, a cellular telephone, a clamshell or a wristwatch, as, for example, shown in U.S. patent application Ser. No. 10/090,653, filed Mar. 4, 2002, assigned to the same assignee as the instant application, and incorporated herein by reference thereto.

In the preferred embodiment, the arrangement 20 measures less than about 30 cubic centimeters in volume. This compact, miniature size allows the arrangement 20 to be mounted in housings of many diverse shapes, large or small, portable or stationary, including some having an on-board display 12, a keypad 14, and a window 16 through which the image is projected.

Referring to FIGS. 2 and 3, the arrangement 20 includes a semiconductor laser 22 which, when energized, emits a bright red laser beam at about 635–655 nanometers. Lens 24 is a biaspheric convex lens having a positive focal length and is operative for collecting virtually all the energy in the red beam and for producing a diffraction-limited beam. Lens 26 is a concave lens having a negative focal length. Lenses 24, 26 are held by non-illustrated respective lens holders apart on a support (not illustrated in FIG. 2 for clarity) inside the instrument 10. The lenses 24, 26 shape the red beam profile over the working distance.

Another semiconductor laser 28 is mounted on the support and, when energized, emits a diffraction-limited blue laser beam at about 475–505 nanometers. Another biaspheric convex lens 30 and a concave lens 32 are employed to shape the blue beam profile in a manner analogous to lenses 24, 26.

A green laser beam having a wavelength on the order of 530 nanometers is generated not by a semiconductor laser, but instead by a green module 34 having an infrared diode-pumped YAG crystal laser whose output beam is 1060 nanometers. A non-linear frequency doubling crystal is included in the infrared laser cavity between the two laser mirrors. Since the infrared laser power inside the cavity is much larger than the power coupled outside the cavity, the frequency doubler is more efficient generating the double frequency green light inside the cavity. The output mirror of the laser is reflective to the 1060 nm infrared radiation, and transmissive to the doubled 530 nm green laser beam. Since the correct operation of the solid-state laser and frequency doubler require precise temperature control, a semiconductor device relying on the Peltier effect is used to control the temperature of the green laser module. The thermo-electric cooler can either heat or cool the device depending on the polarity of the applied current. A thermistor is part of the green laser module in order to monitor its temperature. The readout from the thermistor is fed to the controller, which adjusts the control current to the thermo-electric cooler accordingly.

As explained below, the lasers are pulsed in operation at frequencies on the order of 100 MHz. The red and blue semiconductor lasers 22, 28 can be pulsed at such high frequencies, but the currently available green solid-state lasers cannot. As a result, the green laser beam exiting the green module 34 is pulsed with an acousto-optical modulator (AOM) 36 which creates an acoustic standing wave inside a crystal for diffracting the green beam. The AOM 36, however, produces a zero-order, non-diffracted beam 38 and a first-order, pulsed, diffracted beam 40. The beams 38, 40 diverge from each other and, in order to separate them to eliminate the undesirable zero-order beam 38, the beams 38, 40 are routed along a long, folded path having a folding mirror 42. Alternatively, the AOM can be used either externally or internally to the green laser module to pulse the green laser beam. Other possible ways to modulate the green laser beam include electro-absorption modulation, or Mach-Zender interferometer. The AOM is shown schematically in FIG. 2, and is described in greater detail in FIGS. 8–14.

The beams 38, 40 are routed through positive and negative lenses 44, 46. However, only the diffracted green beam 40 is allowed to impinge upon, and reflect from, the folding mirror 48. The non-diffracted beam 38 is absorbed by an absorber 50, preferably mounted on the mirror 48.

The arrangement includes a pair of dichroic filters 52, 54 arranged to make the green, blue and red beams as co-linear as possible before reaching a scanning assembly 60. Filter 52 allows the green beam 40 to pass therethrough, but the blue beam 56 from the blue laser 28 is reflected by the interference effect. Filter 54 allows the green and blue beams 40, 56 to pass therethrough, but the red beam 58 from the red laser 22 is reflected by the interference effect.

Figure 4:
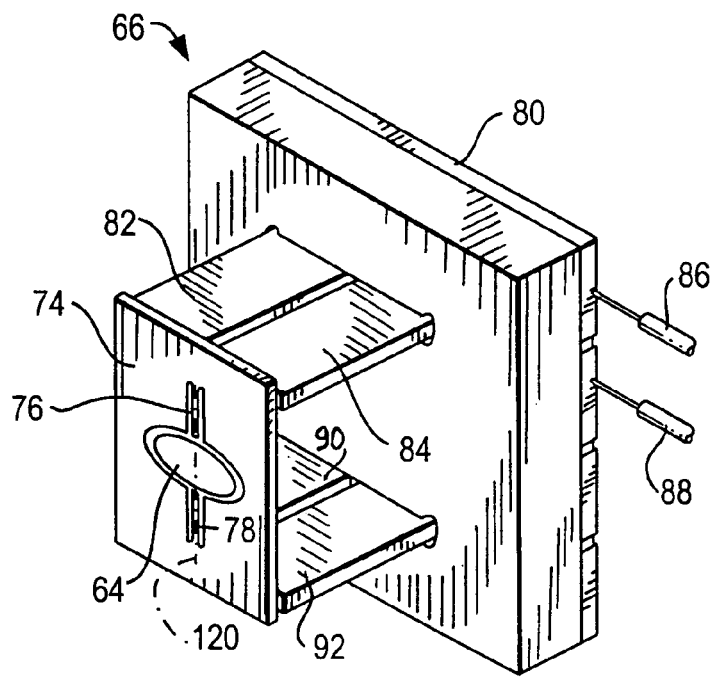
FIG. 4 is a perspective front view of an inertial drive for use in the arrangement of FIG. 2.
Figure 5:
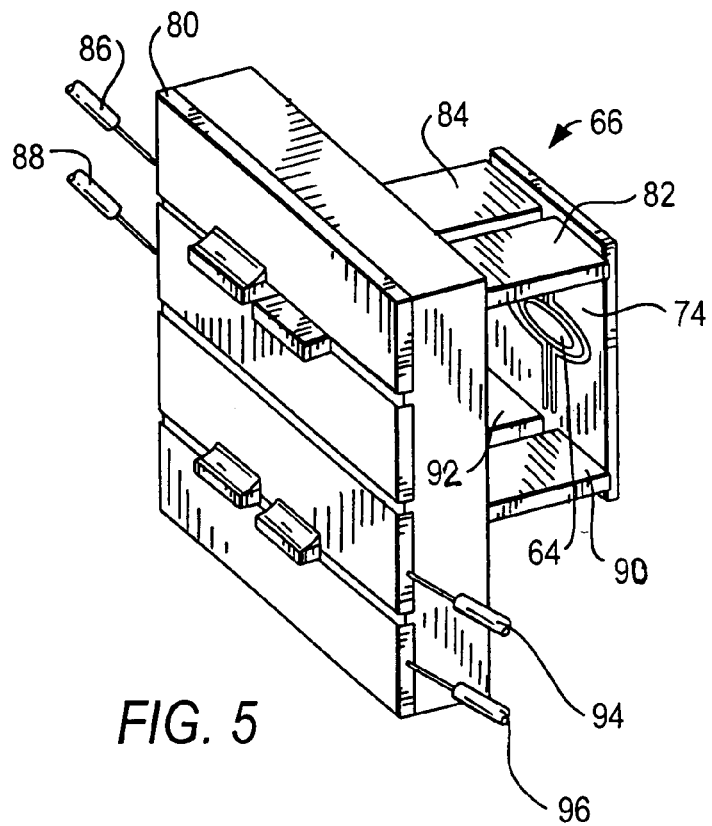
FIG. 5 is a perspective rear view of the inertial drive of FIG. 4.

The nearly co-linear beams 40, 56, 58 are directed to, and reflected off, a stationary bounce mirror 62. The scanning assembly 60 includes a first scan mirror 64 oscillatable by an inertial drive 66 (shown in isolation in FIGS. 4–5) at a first scan rate to sweep the laser beams reflected off the bounce mirror 62 over the first horizontal scan angle A, and a second scan mirror 68 oscillatable by an electromagnetic drive 70 at a second scan rate to sweep the laser beams reflected off the first scan mirror 64 over the second vertical scan angle B. In a variant construction, the scan mirrors 64, 68 can be replaced by a single two-axis mirror.

The inertial drive 66 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the scanning assembly 60 to less than one watt and, in the case of projecting a color image, as described below, to less than ten watts.

The drive 66 includes a movable frame 74 for supporting the scan mirror 64 by means of a hinge that includes a pair of co-linear hinge portions 76, 78 extending along a hinge axis and connected between opposite regions of the scan mirror 64 and opposite regions of the frame. The frame 74 need not surround the scan mirror 64, as shown.

The frame, hinge portions and scan mirror are fabricated of a one-piece, generally planar, silicon substrate which is approximately 150$\mu$ thick. The silicon is etched to form omega-shaped slots having upper parallel slot sections, lower parallel slot sections, and U-shaped central slot sections. The scan mirror 64 preferably has an oval shape and is free to move in the slot sections. In the preferred embodiment, the dimensions along the axes of the oval-shaped scan mirror measure 749$\mu$×1600$\mu$. Each hinge portion measure 27$\mu$ in width and 1130$\mu$ in length. The frame has a rectangular shape measuring 3100$\mu$ in width and 4600$\mu$ in length.

The inertial drive is mounted on a generally planar, printed circuit board 80 and is operative for directly moving the frame and, by inertia, for indirectly oscillating the scan mirror 64 about the hinge axis. One embodiment of the inertial drive includes a pair of piezoelectric transducers 82, 84 extending perpendicularly of the board 80 and into contact with spaced apart portions of the frame 74 at either side of hinge portion 76. An adhesive may be used to insure a permanent contact between one end of each transducer and each frame portion. The opposite end of each transducer projects out of the rear of the board 80 and is electrically connected by wires 86, 88 to a periodic alternating voltage source (not shown).

In use, the periodic signal applies a periodic drive voltage to each transducer and causes the respective transducer to alternatingly extend and contract in length. When transducer 82 extends, transducer 84 contracts, and vice versa, thereby simultaneously pushing and pulling the spaced apart frame portions and causing the frame to twist about the hinge axis. The drive voltage has a frequency corresponding to the resonant frequency of the scan mirror. The scan mirror is moved from its initial rest position until it also oscillates about the hinge axis at the resonant frequency. In a preferred embodiment, the frame and the scan mirror are about 150$\mu$ thick, and the scan mirror has a high Q factor. A movement on the order of 1$\mu$ by each transducer can cause oscillation of the scan mirror at scan rates in excess of 20 kHz.

Another pair of piezoelectric transducers 90, 92 extends perpendicularly of the board 80 and into permanent contact with spaced apart portions of the frame 74 at either side of hinge portion 78. Transducers 90, 92 serve as feedback devices to monitor the oscillating movement of the frame and to generate and conduct electrical feedback signals along wires 94, 96 to a feedback control circuit (not shown).

Alternately, instead of using piezo-electric transducers 90, 92 for feedback, magnetic feedback can be used, where a magnet is mounted on the back of the high-speed mirror, and an external coil is used to pickup the changing magnetic field generated by the oscillating magnet.

Although light can reflect off an outer surface of the scan mirror, it is desirable to coat the surface of the mirror 64 with a specular coating made of gold, silver, aluminum, or a specially designed highly reflective dielectric coating.

The electromagnetic drive 70 includes a permanent magnet jointly mounted on and behind the second scan mirror 68, and an electromagnetic coil 72 operative for generating a periodic magnetic field in response to receiving a periodic drive signal. The coil 72 is adjacent the magnet so that the periodic field magnetically interacts with the permanent field of the magnet and causes the magnet and, in turn, the second scan mirror 68 to oscillate.

The inertial drive 66 oscillates the scan mirror 64 at a high speed at a scan rate preferably greater than 5 kHz and, more particularly, on the order of 18 kHz or more. This high scan rate is at an inaudible frequency, thereby minimizing noise and vibration. The electromagnetic drive 70 oscillates the scan mirror 68 at a slower scan rate on the order of 40 Hz which is fast enough to allow the image to persist on a human eye retina without excessive flicker.

The faster mirror 64 sweeps a horizontal scan line, and the slower mirror 68 sweeps the horizontal scan line vertically, thereby creating a raster pattern which is a grid or sequence of roughly parallel scan lines from which the image is constructed. Each scan line has a number of pixels. The image resolution is preferably XGA quality of 1024×768 pixels. Over a limited working range we can display high-definition television standard, denoted 720p, 1270×720 pixels. In some applications, a one-half VGA quality of 320×480 pixels, or one-fourth VGA quality of 320×240 pixels, is sufficient. At minimum, a resolution of 160×160 pixels is desired.

The roles of the mirrors 64, 68 could be reversed so that mirror 68 is the faster, and mirror 64 is the slower. Mirror 64 can also be designed to sweep the vertical scan line, in which event, mirror 68 would sweep the horizontal scan line. Also, the inertial drive can be used to drive the mirror 68. Indeed, either mirror can be driven by an electromechanical, electrical, mechanical, electrostatic, magnetic, or electromagnetic drive.

The slow-mirror is operated in a constant velocity sweep-mode during which time the image is displayed. During the mirror's return, the mirror is swept back into the initial position at its natural frequency, which is significantly higher. During the mirror's return trip, the lasers can be powered down in order to reduce the power consumption of the device.

Figure 6:
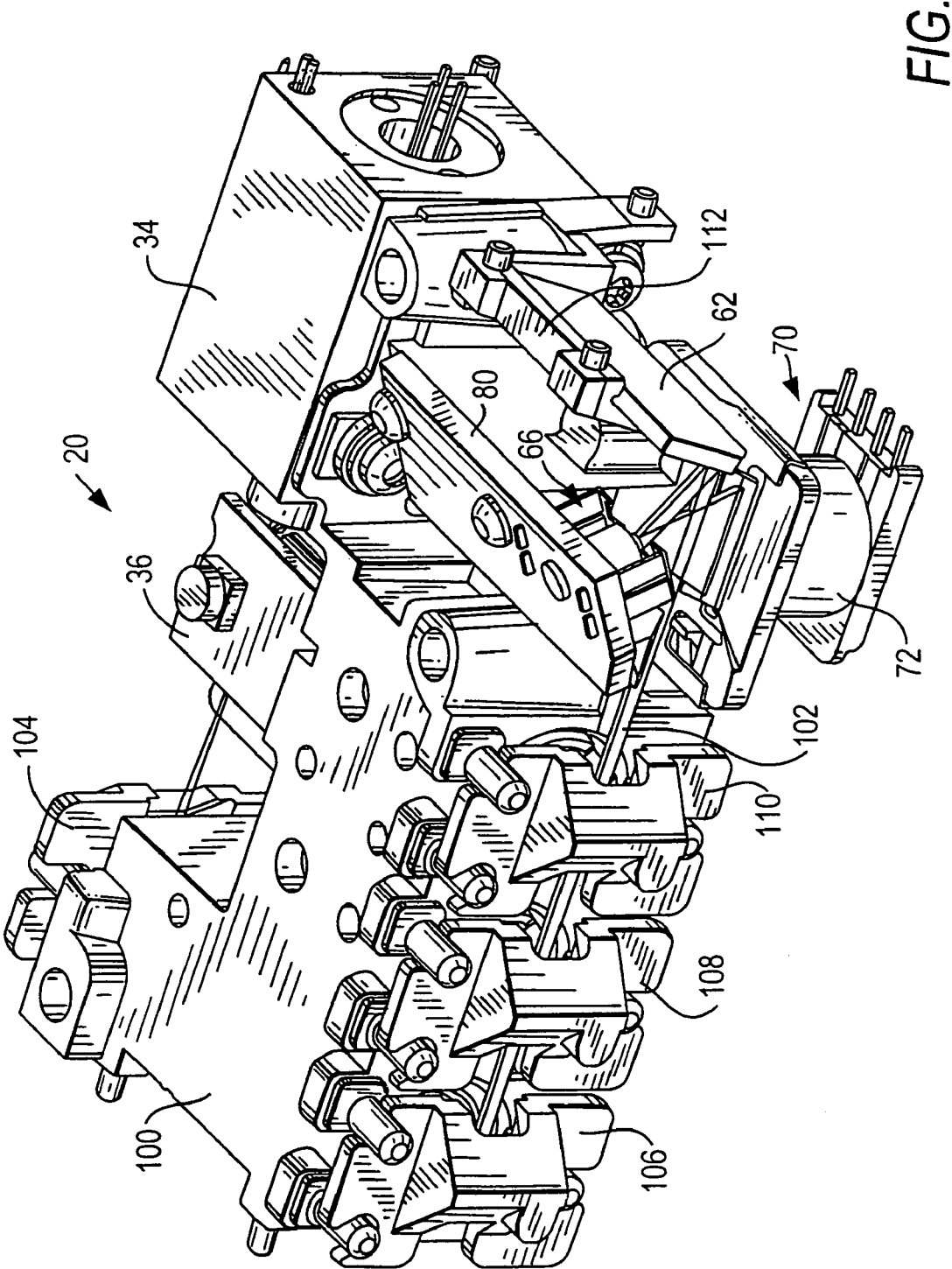
FIG. 6 is a perspective view of a practical implementation of the arrangement of FIG. 2.
Figure 11:
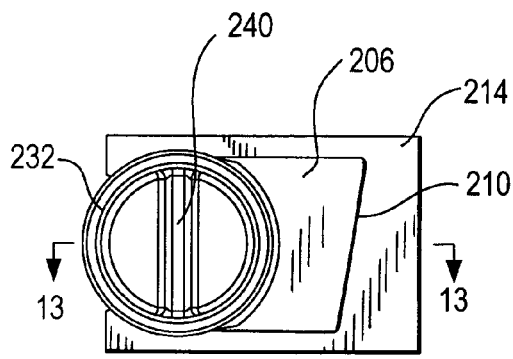
FIG. 11 is a bottom plan view of the AOM of FIG. 8.
Figure 12:
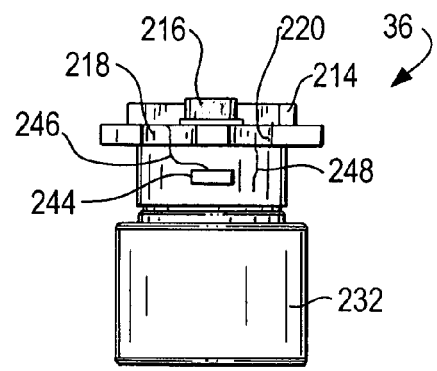
FIG. 12 is a front elevational view of the AOM of FIG. 8.

FIG. 6 is a practical implementation of the arrangement 20 in the same perspective as that of FIG. 2. The aforementioned components are mounted on a support which includes a top cover 100 and a support plate 102. Holders 104, 106, 108, 110, 112 respectively hold folding mirrors 42, 48, filters 52, 54 and bounce mirror 62 in mutual alignment. Each holder has a plurality of positioning slots for receiving positioning posts stationarily mounted on the support. Thus, the mirrors and filters are correctly positioned. As shown, there are three posts, thereby permitting two angular adjustments and one lateral adjustment. Each holder can be glued in its final position.

The image is constructed by selective illumination of the pixels in one or more of the scan lines. As described below in greater detail with reference to FIG. 7, a controller 114 causes selected pixels in the raster pattern to be illuminated, and rendered visible, by the three laser beams. For example, red, blue and green power controllers 116, 118, 120 respectively conduct electrical currents to the red, blue and green lasers 22, 28, 34 to energize the latter to emit respective light beams at each selected pixel, and do not conduct electrical currents to the red, blue and green lasers to deenergize the latter to non-illuminate the other non-selected pixels. The resulting pattern of illuminated and non-illuminated pixels comprise the image, which can be any display of human- or machine-readable information or graphic.

Referring to FIG. 1, the raster pattern is shown in an enlarged view. Starting at an end point, the laser beams are swept by the inertial drive along the horizontal direction at the horizontal scan rate to an opposite end point to form a scan line. Thereupon, the laser beams are swept by the electromagnetic drive 70 along the vertical direction at the vertical scan rate to another end point to form a second scan line. The formation of successive scan lines proceeds in the same manner.

The image is created in the raster pattern by energizing or pulsing the lasers on and off at selected times under control of the microprocessor 114 or control circuit by operation of the power controllers 116, 118, 120. The lasers produce visible light and are turned on only when a pixel in the desired image is desired to be seen. The color of each pixel is determined by one or more of the colors of the beams. Any color in the visible light spectrum can be formed by the selective superimposition of one or more of the red, blue, and green lasers. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

As shown in FIG. 7, an incoming video signal having vertical and horizontal synchronization data, as well as pixel and clock data, is sent to red, blue and green buffers 122, 124, 126 under control of the microprocessor 114. The storage of one full VGA frame requires many kilobytes, and it would be desirable to have enough memory in the buffers for two full frames to enable one frame to be written, while another frame is being processed and projected. The buffered data is sent to a formatter 128 under control of a speed profiler 130 and to red, blue and green look up tables (LUTs) 132, 134, 136 to correct inherent internal distortions caused by scanning, as well as geometrical distortions caused by the angle of the display of the projected image. The resulting red, blue and green digital signals are converted to red, blue and green analog signals by digital to analog converters (DACs) 138, 140, 142. The red and blue analog signals are fed to red and blue laser drivers (LDs) 144, 146 which are also connected to the red and blue power controllers 116, 118. The green analog signal is fed to the AOM radio frequency (RF) driver 150 and, in turn, to the green laser 34 which is also connected to a green LD 148 and to the green power controller 120.

Feedback controls are also shown in FIG. 7, including red, blue and green photodiode amplifiers 152, 154, 156 connected to red, blue and green analog-to-digital (A/D) converters 158, 160, 162 and, in turn, to the microprocessor 114. Heat is monitored by a thermistor amplifier 164 connected to an A/D converter 166 and, in turn, to the microprocessor.

The scan mirrors 64, 68 are driven by drivers 168, 170 which are fed analog drive signals from DACs 172, 174 which are, in turn, connected to the microprocessor. Feedback amplifiers 176, 178 detect the position of the scan mirrors 64, 68, and are connected to feedback A/D 180, 182 and, in turn, to the microprocessor.

A power management circuit 184 is operative to minimize power while allowing fast on-times, preferably by keeping the green laser on all the time, and by keeping the current of the red and blue lasers just below the lasing threshold.

A laser safety shut down circuit 186 is operative to shut the lasers off if either of the scan mirrors 64, 68 is detected as being out of position.

The AOM 36, shown schematically in FIGS. 2–3 and 6, is shown in isolation and in a detailed perspective view in FIG. 8 and in an exploded view in FIG. 9. The AOM 36 includes an assembly having a crystal 200, for example, tellurium dioxide, through which a laser beam, for example, the green beam from the green laser 34, passes, and an acoustic transducer 202, for example, a piezoelectric transducer, for generating acoustic waves through the crystal.

Figure 13:
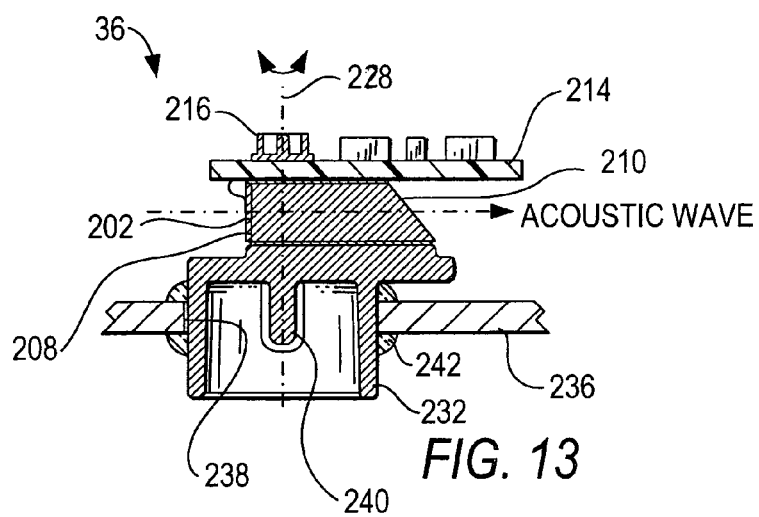
FIG. 13 is a sectional view taken on line 13—13 of FIG. 1, and shown mounted on FIG. 14 is an electrical schematic of the matching network used in the AOM of FIG. 8.

As best seen in FIG. 9, the green beam 204 is incident on planar side surface 206 of the crystal, passes in one direction through the crystal, and exits through an opposite side surface of the crystal. The acoustic wave passes through the crystal along a transverse direction perpendicular to the beam passage. As best seen in FIG. 13, the acoustic wave passes from a front side surface 208 to a rear side surface 210 of the crystal. As is conventional, the laser beam traveling through the crystal is diverted from its path by the acoustic wave in a process called Brillouin scattering. The output laser beam is modulated by the presence of the acoustic waves. The output green laser beam has a zero-order non-diffraction beam component 38 and a first-order diffraction beam component 40, as described above. It is the more useful diffraction beam component 40 whose output power is to be adjusted in accordance with this invention to produce the green color component of the projected image.

Figure 14:
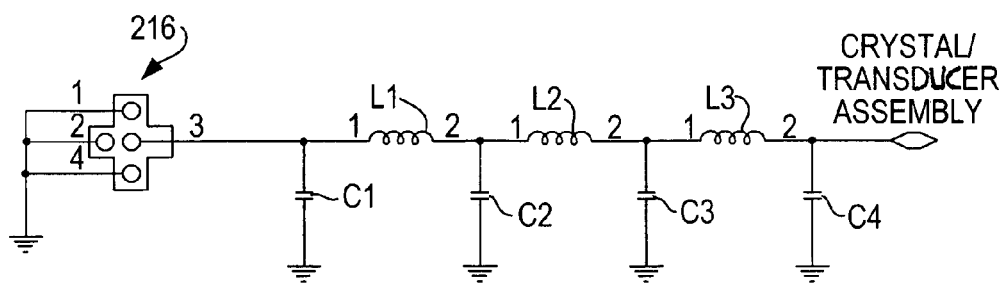

The AOM 36 further comprises a matching network 212 for impedance matching of an acoustic drive signal, e.g., a radio frequency, to the transducer 202. The matching network 212 includes a printed circuit board (PCB) 214 on which an electrical connector, for example, a co-axial radio frequency (RF) connector 216, is mounted, together with non-tunable, passive components, such as inductors L1, L2, L3 and capacitors C1, C2, C3, C4, as shown in FIG. 14. The PCB 214 has castellations or semi-circular notches 218, 220 at an edge 222 of the PCB. These notches are individually conductively plated.

In accordance with one feature of this invention, the matching network 212 is mounted on top of the crystal and transducer assembly, preferably, with the aid of a double-sided, heat-conductive, low modulus, adhesive tape 224, in planar, surface area contact with an upper planar surface of the assembly. This contrasts with prior art AOMs in which the matching network is spaced apart from the crystal on a heat sink.

In turn, the assembly is mounted on a mount 230 having a cylindrical portion 232 and a planar platform portion 234. A lower planar surface of the assembly is mounted in planar, surface area contact with the platform portion 234, again aided by a double-sided, heat-conductive, low modulus, adhesive tape 226. As best seen in FIG. 13, the cylindrical portion 232 has a central axis 228 and the RF connector 216 is co-axial with the axis.

The aforementioned support plate 102 has a shelf 236 underlying the AOM. As seen in FIG. 13, the shelf 236 has a mounting passage 238 into which the cylindrical portion 232 is received with freedom to move along the axis 228 (for height adjustment) as well as in either circumferential direction about the axis 228 (for clockwise or counterclockwise angular adjustment). Since the crystal and transducer assembly and the matching network are all stacked on top of the mount, all of these components participate in the joint movement.

The interior of the cylindrical portion 232 has a diametrical rib 240 (see also FIG. 11) for engagement with a tool for axially lifting or lowering the mount and/or for circumferentially turning the mount. Once the desired position of the crystal relative to the incident laser beam, as described more fully below, is reached, a curable adhesive 242, such as an ultraviolet curable adhesive, is introduced between the mount and the shelf to fix the mount in the adjusted position.

The transducer 202 has an electrode 244 (see FIG. 12) on its vertical side face that faces to the left in FIG. 13. The plated notches 218, 220 also have vertical side faces that face in the same direction, i.e., to the left in FIG. 13. A first wire bond 246 is connected between the notch 218 and the electrode 244. A second wire bond 248 is connected between the notch 220 and a ground of the transducer. The notches overhang the electrode face of the transducer. Each wire bond is directly made from one point to another point without changing the orientation of any of the components during wirebonding. This contrasts with prior art wirebonding in which the opposite ends of each wire face in different directions, thereby requiring a reorientation of the components during wirebonding.

In order to adjust the output power of the green beam, preferably the diffracted beam component 40 thereof, the green laser 34 is energized and, in addition, the acoustic drive signal is conducted to the transducer by the RF connector 216. In the preferred setup, a spring-loaded probe is axially positioned into electrical contact with the RF connector. Then, the height and/or angle of the incident face 206 of the crystal is positioned relative to the incident laser beam by moving the mount. When the output power of the diffracted beam component 40 is at a maximum, the position of the mount and, hence, of the incident face 206 is fixed by application of the adhesive 242. It will be noted that the position of the RF connector 216 in alignment with the axis 228 insures that the RF probe does not interfere with the adjustment. In other words, the RF probe does not need to be moved during the adjustment, even though the RF probe is connected to the RF connector 216 during the adjustment.

As previously mentioned, all of the impedances of the matching network are fixed, i.e., non-tunable. This contrasts with prior art tuning air coils whose presence makes the conventional matching networks very bulky and unsuitable for miniaturized, hand-held, battery-operated applications.

It will be understood that each of the elements described above, or two or more together, also may find a useful application in other types of constructions differing from the types described above.

While the invention has been illustrated and described as embodied in an AOM, a method of making the AOM, and an arrangement for and a method of adjusting laser beam power using the AOM, especially for use in a color image projection arrangement and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A compact, acousto-optical modulator (AOM), comprising:

a) an assembly including a crystal and an acoustic transducer, for modulating intensity of a laser beam incident on the crystal with an acoustic wave generated by the transducer to produce a modulated output beam;

b) a matching network supported by the assembly, for impedance matching of an acoustic drive signal to the transducer; and c) a mount having an axis, and operative for supporting the assembly and the matching network for joint movement along, and in a circumferential direction about, the axis.

2. The AOM of claim 1, wherein the mount has a cylindrical portion symmetrical about the axis, and a platform portion extending radially of the axis.

3. The AOM of claim 2, and an adhesive for surface area mounting the assembly on the platform portion.

4. The AOM of claim 2, wherein the assembly has an upper surface, and an adhesive for surface area mounting the matching network on the upper surface of the assembly.

5. The AOM of claim 1, wherein the matching network includes a printed circuit board and a connector mounted on the board in axial alignment with the axis.

6. The AOM of claim 5, wherein the matching network includes non-adjustable impedances on the board.

7. The AOM of claim 2, wherein the mount includes an engaging portion for engaging a tool for moving the mount along, and in the circumferential direction about, the axis.

8. The AOM of claim 1, wherein the matching network includes a printed circuit board extending radially of the axis, the board having at least one conductively plated edge lying in a plane generally parallel to the axis; and wherein the transducer has an electrode lying in a plane also generally parallel to the axis; and at least one wire bond electrically connected between the at least one plated edge and the electrode.

9. A method of making a compact, acousto-optical modulator (AOM), comprising the steps of:
   a) mounting an assembly including a crystal and an acoustic transducer on a mount having an axis, the assembly being operative for modulating intensity of a laser beam incident on the crystal with an acoustic wave generated by the transducer to produce a modulated output beam; and
   b) mounting a matching network on the assembly, the matching network being operative for impedance matching of an acoustic drive signal to the transducer, the matching network and the assembly being supported by the mount for joint movement along, and in a circumferential direction about, the axis.

10. The method of claim 9, wherein the assembly is surface area mounted on the mount with an adhesive; and wherein the matching network is surface area mounted on the assembly with an adhesive.

11. An arrangement for adjusting laser beam power, comprising:
   a) a support having a mounting passage;
   b) a laser supported by the support, for emitting a laser beam; and
   c) an acousto-optical modulator (AOM) including an assembly having a crystal and an acoustic transducer, the assembly being operative for modulating intensity of the laser beam incident on the crystal with an acoustic wave generated by the transducer to produce a modulated output beam having a power, the AOM including a matching network supported by the assembly for impedance matching of an acoustic drive signal to the transducer, the AOM including a mount having an axis and operative for supporting the assembly and the matching network, the mount being mounted in the mounting passage for movement relative to the laser beam along, and in a circumferential direction about, the axis to an adjustment position in which the power of the modulated output beam is set to an adjusted value.

12. The arrangement of claim 11, wherein the modulated output beam includes a zero-order, non-diffracted beam component and a first-order, diffracted beam component, and wherein the mount is movable for adjusting the power of the diffracted beam component.

13. The arrangement of claim 11, wherein the support includes an optical assembly for focusing the modulated output beam, and a scanner for sweeping the modulated output beam as a pattern of scan lines in space at a working distance from the support, each scan line having a number of pixels; and a controller for causing selected pixels to be illuminated, and rendered visible, by the modulated output beam to produce an image.

14. The arrangement of claim 11, wherein the mount has a cylindrical portion symmetrical about the axis, and a platform portion extending radially of the axis.

15. The arrangement of claim 14, and a first adhesive for surface area mounting the assembly on the platform portion, and a second adhesive for surface area mounting the matching network on an upper surface of the assembly.

16. The arrangement of claim 11, wherein the matching network includes a printed circuit board and a connector mounted on the board in alignment with the axis.

17. The arrangement of claim 14, wherein the mount includes an engaging portion for engaging a tool for moving the mount along, and in the circumferential direction about, the axis.

18. A method of adjusting laser beam power, comprising the steps of;
   a) forming a mounting passage in a support;
   b) supporting a laser on the support, and energizing the laser for emitting a laser beam;
   c) mounting a mount having an axis in the mounting passage for movement relative to the laser beam along, and in a circumferential direction about, the axis;
   d) mounting an acousto-optical modulator (AOM) assembly on the mount for joint movement therewith, the assembly including a crystal and an acoustic transducer and being operative for modulating intensity of the laser beam incident on the crystal with an acoustic wave generated by the transducer to produce a modulated output beam having a power;
   e) mounting a matching network on the assembly for impedance matching of an acoustic drive signal applied to the transducer; and
   f) moving the mount in the mounting passage while energizing the laser and while applying the acoustic drive signal to adjust the power of the modulated output beam to an adjusted value.

19. The method of claim 18, wherein the matching network includes a connector aligned with the axis.

20. The method of claim 18, wherein the moving step is performed by a movable tool engaging the mount.

* * * * *